June 9, 1953  E. R. POOLE  2,640,988
EYEGLASS GLARE SHIELD ATTACHMENT
Filed Aug. 22, 1951
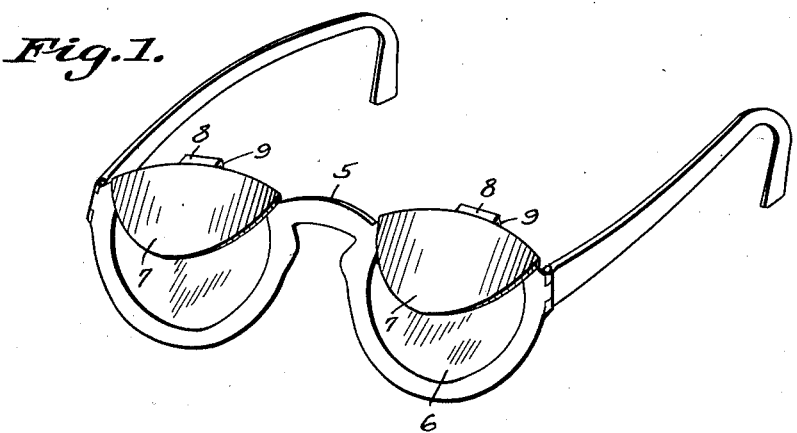
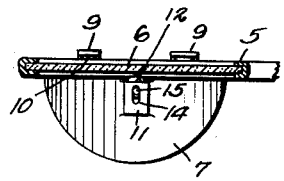
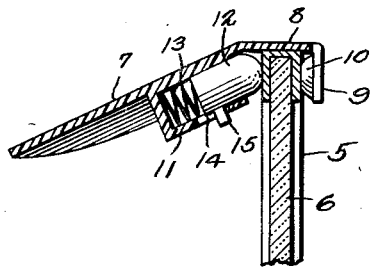
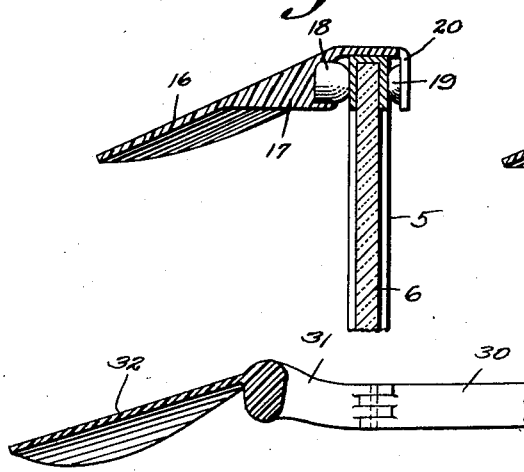
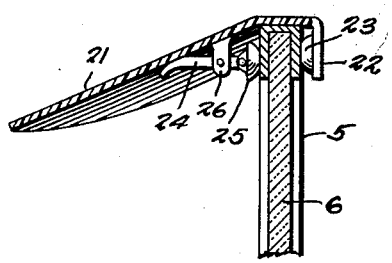
E. R. Poole
INVENTOR,
BY Snow & Co.
ATTORNEYS.

Patented June 9, 1953

2,640,988

UNITED STATES PATENT OFFICE 2,640,988

EYEGLASS GLARE SHIELD ATTACHMENT

Elbridge R. Poole, Booneville, Ind.

Application August 22, 1951, Serial No. 243,051

2 Claims. (Cl. 2—13)

This invention relates to eye shields, the primary object of the invention being to provide an eye shield which may be readily and easily attached to eyeglasses, the construction of the shield being such that the shield will be so disposed that the eyes of the person wearing the shield will be protected against sun rays and over-head light, for the convenience of the wearer.

An important object of the invention is to provide means forming a part of the shield to be snapped over the upper edge of the eyeglass frame on which the shield is mounted, securing the shield in proper position and at the proper angle with respect to the lenses of the eyeglasses, to avoid distorting the line of vision through the lenses of the eyeglasses.

A still further object of the invention is to provide clamping means forming a part of the eyeglass shield for securely clamping the eyeglass frame to hold the shield in position.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a perspective view illustrating an eyeglass frame equipped with shields, constructed in accordance with the invention.

Fig. 2 is a bottom plan view of a shield positioned on an eyeglass frame, the lenses of the eyeglasses being shown in section.

Fig. 3 is a vertical sectional view through the lens of an eyeglass illustrating a shield as clamped in position thereon.

Fig. 4 is a vertical sectional view through an eyeglass illustrating a modified form of shield as connected thereto.

Fig. 5 is a vertical sectional view through an eyeglass illustrating a further modified form of shield clamping means.

Fig. 6 is a fragmental sectional view showing a modified form of the invention.

Referring to the drawing in detail, the reference character 5 indicates an eyeglass frame in which the lenses 6 are mounted.

The reference character 7 indicates an eyeglass shield, which may be constructed of any suitable opaque or translucent material, such as plastic or the like, the shield being so shaped that it extends forwardly from the eyeglass frame on which it is positioned, to shield the eyes of the wearer against intense sun rays and over-head light.

As shown by Fig. 3 of the drawing, the shield is provided with a flat section 8 from which the main portion of the shield extends. At the rear of the flat section 8 are spaced fingers 9 that are provided with cushioning members 10 formed in the inner surfaces thereof, the cushioning members 10 being designed to engage the inner surfaces of the eyeglass frame adjacent to the upper edge thereof.

Each shield also includes a tubular housing 11, which is disposed at a point between the spaced fingers. Mounted within the tubular housing, is the plunger 12, which is biased towards the frame of the eyeglass by the coiled spring 13 which is disposed within the tubular housing between one end of the plunger 12 and end wall of the tubular housing.

Formed in the side of the tubular housing 11 is the elongated opening 14 in which the finger 15 extends, the finger 15 contacting one end of the elongated opening, restricting outward movement of the plunger, so that the plunger will be held within the housing at all times, and cannot become accidently displaced.

In the form of the invention as shown in Fig. 4 of the drawings, the shield which is indicated by the reference character 16 is provided with an enlargement 17 in which the cushioning member 18 is held, the cushioning member 18 cooperating with cushioning members 19, carried by fingers 20 that extend downwardly from the shield, the cushioning members 18 and 19, because of their clamping action against the eyeglass frame, supporting the shield at the proper angle with respect to the eyeglass frame. In this form of the invention, the eyeglass shield is merely forced over the upper edge of an eyeglass frame, the members 18 and 19 gripping the shield as previously indicated.

Another form of the invention is illustrated by Fig. 5 of the drawing in which the shield is indicated by the reference character 21, and in this form of the invention spaced fingers 22 are formed on one edge of the shield, the spaced fingers extending laterally from the body of the shield where they support cushioning members 23 to fit against one side of the eyeglass frame on which the shield is positioned.

Cooperating with the cushioning members 23 is a pivoted arm 24 that carries the head 25 at one end thereof, the head being designed to press against the outer surface of the eyeglass frame to cause a binding action between the eyeglass frame and cushioning member 23, securely holding the shield in position.

The pivoted arm 24 is mounted between ears 26 that extend from the inner surface of the shield 21.

As illustrated by Fig. 6 of the drawing, the principle of the invention is carried out in providing an eye shield as a unit, wherein the usual eyeglass temples 30 are connected by means of the bar 31 which extends across the forehead above the eyes and from which the shields 32 extend.

With the structure as shown by Fig. 6, it will be obvious that persons may have the benefit of eye shields of this character without the necessity of using eyeglasses.

From the foregoing it will be seen that due to the construction of the shield forming the subject matter of the present invention, the shield may be readily and easily snapped into position over the outer edge of eyeglasses holding the shields in position at the desired angle without the necessity of adjusting the shield in any way to attain the proper angle. Eyeglasses equipped with a shield of this character will protect the eyes of the wearer against intensive sun rays and overhead light.

Having thus described the invention, what is claimed is:

1. In an eyeglass shield, an opaque body curved to fit over the upper edge of an eyeglass frame, a depending clamping member formed on one edge of said body, a tubular housing secured to the opaque body opposite to said depending member, a slidable gripping member mounted in the tubular housing cooperating with the depending member in gripping the upper edge of the eyeglass frame, and a spring mounted within the tubular housing engaging said gripping member normally biasing said gripping member towards said depending member, gripping the eyeglass frame.

2. In an eyeglass shield, an opaque body curved to fit over the upper edge of an eyeglass frame, a depending clamping member formed on one edge of the body, a tubular housing secured to the under surface of the opaque body at a point opposite to said depending member, said tubular housing having an open end disposed towards said depending clamping member, a plunger disposed within said housing, said plunger having a curved end adapted to engage an eyeglass frame cooperating with said depending member in gripping such eye-glass frame, and a coiled spring mounted within the housing in contact with said plunger, biasing said plunger towards the depending member.

ELBRIDGE R. POOLE.

References Cited in the file of this patent

UNITED STATES PATENTS

| Number | Name | Date |
|---|---|---|
| 1,546,344 | Harris | July 14, 1925 |
| 1,624,337 | Halikman | Apr. 12, 1927 |
| 1,749,676 | Sadler | Mar. 4, 1930 |
| 2,544,221 | Creighton | Mar. 6, 1951 |

FOREIGN PATENTS

| Number | Country | Date |
|---|---|---|
| 118,094 | Australia | Feb. 2, 1944 |
| 305,513 | Great Britain | Feb. 6, 1929 |